(12) United States Patent
Tong et al.

(10) Patent No.: US 10,084,641 B2
(45) Date of Patent: Sep. 25, 2018

(54) NETWORK PARAMETER CONFIGURATION METHOD AND APPARATUS FOR PORTABLE ROUTER

(71) Applicant: Huawei Device (Shenzhen) Co., Ltd., Shenzhen (CN)

(72) Inventors: Shuang Tong, Shenzhen (CN); Yuling Zhang, Shenzhen (CN)

(73) Assignee: Huawei Device (Shenzhen) Co., Ltd., Shenzhen (CN)

( * ) Notice: Subject to any disclaimer, the term of this patent is extended or adjusted under 35 U.S.C. 154(b) by 146 days.

(21) Appl. No.: 15/033,574

(22) PCT Filed: Nov. 1, 2013

(86) PCT No.: PCT/CN2013/086434
§ 371 (c)(1),
(2) Date: Apr. 29, 2016

(87) PCT Pub. No.: WO2015/062080
PCT Pub. Date: May 7, 2015

(65) Prior Publication Data
US 2016/0254949 A1    Sep. 1, 2016

(51) Int. Cl.
*H04L 12/24* (2006.01)
*H04L 29/12* (2006.01)

(52) U.S. Cl.
CPC ...... *H04L 41/0803* (2013.01); *H04L 41/0816* (2013.01); *H04L 41/0856* (2013.01); *H04L 41/0886* (2013.01); *H04L 61/6022* (2013.01)

(58) Field of Classification Search
CPC ............. H04L 12/2881; H04L 12/2859; H04L 61/2015; H04L 12/2856; H04L 69/24;
(Continued)

(56) References Cited

U.S. PATENT DOCUMENTS

2003/0189928 A1* 10/2003 Xiong ................ H04L 61/2015
370/389
2004/0003060 A1   1/2004 Asoh et al.
(Continued)

FOREIGN PATENT DOCUMENTS

CN        1729433 A       2/2006
CN      101998695 A       3/2011

*Primary Examiner* — Jung-Jen Liu
(74) *Attorney, Agent, or Firm* — Leydig, Voit & Mayer, Ltd.

(57) ABSTRACT

The present invention discloses a network parameter configuration method, which includes: selecting, by the portable router, at least one target network configuration parameter package from at least two network configuration parameter packages that are pre-saved, where the network configuration parameter package includes at least a network connection parameter of the portable router; setting, by the portable router according to the at least one target network configuration parameter package, a network configuration parameter of the portable router; and requesting, by the portable router, to access an uplink network connected to an uplink network port of the portable router. According to the present invention, when the portable router switches from one scenario to another, a configuration parameter of the portable router may be quickly restored to a configuration parameter that was pre-saved for the another application scenario, so that reconfiguration of the portable router is avoided and configuration efficiency is improved.

5 Claims, 5 Drawing Sheets (58) Field of Classification Search
CPC ... H04L 12/413; H04L 69/18; H04L 41/0886; H04L 41/082; H04L 12/2803; H04L 63/01; H04M 11/066
See application file for complete search history.

(56) References Cited

U.S. PATENT DOCUMENTS

| | | |
|---|---|---|
| 2005/0221844 A1 | 10/2005 | Trethewey et al. |
| 2005/0246431 A1 | 11/2005 | Spitaels |
| 2005/0261026 A1 | 11/2005 | Hausman et al. |
| 2008/0162702 A1* | 7/2008 | Jia ..................... H04L 12/2856 709/227 |
| 2009/0013210 A1* | 1/2009 | McIntosh ............ H04L 41/0672 714/4.1 |
| 2009/0083406 A1* | 3/2009 | Harrington ............. G06F 15/16 709/222 |
| 2009/0106542 A1 | 4/2009 | Dubs et al. |
| 2010/0030903 A1* | 2/2010 | Li ..................... H04L 12/2859 709/228 |
| 2011/0309933 A1 | 12/2011 | Marino |
| 2014/0185600 A1* | 7/2014 | Cheng .................... H04L 49/35 370/338 |
| 2015/0117255 A1* | 4/2015 | Zhang ..................... H04L 69/18 370/254 |

* cited by examiner

NETWORK PARAMETER CONFIGURATION METHOD AND APPARATUS FOR PORTABLE ROUTER

CROSS-REFERENCE TO RELATED APPLICATIONS

This application is a National Stage of International Patent Application No. PCT/CN2013/086434, filed on Nov. 1, 2013, which is hereby incorporated by reference in its entirety.

TECHNICAL FIELD

The present invention relates to the field of communications technologies, and in particular, to a network parameter configuration method and apparatus for a portable router.

BACKGROUND

A portable router (such as Huawei mobile broadband product E5 series) uses a wired network or a wireless network (such as a 3G network) to perform data transmission with a network side, and uses a wireless local area network (WLAN for short) such as a wireless fidelity network (WIFI for short) network to perform data transmission with a terminal device (such as a mobile phone or a tablet computer) with a WIFI function, so as to enable the terminal device with the WIFI function to use the portable router to perform wireless Internet access by using a WIFI network. The portable router has a small size and is easy to carry. The portable router can be used in multiple scenarios such as a hotel, a home, a dormitory, and a company. For example, the portable router is mainly used in a home, and is occasionally brought to a company for use and brought to a hotel for use in a business trip. Configuration parameters for different scenarios may be different. To manage a home network better, in addition to performing basic Internet access configuration, a user further performs some additional configuration operations such as Media Access Control (MAC for short) address binding, bandwidth limiting, and parental control.

However, in a process in which the scenario changes, the user may need to manually operate and set configuration parameters of the portable router in different scenarios, so as to enable a connected mobile phone, tablet computer, and the like, to normally access the wireless network. For example, the configuration parameter needs to be set when the scenario changes from a home to a company, and needs to be reset when the scenario changes from the company back to the home. This operation process is complex and causes inconvenience in using the portable router.

SUMMARY

Technical Problem to be Resolved

In view of this, the technical problem to be resolved in the present invention is: how to simplify a configuration operation by a user on a portable router in a case in which multiple scenarios are being switched.

Solution to Problem

To resolve the foregoing problem, according to a first aspect, the present invention provides a network parameter configuration method for a portable router, including: selecting, by the portable router, at least one target network configuration parameter package from at least two network configuration parameter packages that are pre-saved, where the network configuration parameter package includes at least a network connection parameter of the portable router; setting, by the portable router according to the at least one target network configuration parameter package, a network configuration parameter of the portable router; and requesting, by the portable router, to access an uplink network connected to an uplink network port of the portable router.

With reference to the first aspect, in a first possible implementation manner, before the selecting at least one target network configuration parameter package from at least two network configuration parameter packages that are pre-saved by the portable router, the method includes: setting, by the portable router by using the network configuration parameter package, the network configuration parameter of the portable router; detecting whether the portable router is successfully connected to the uplink network; and if it is detected that the portable router is successfully connected to the uplink network, saving the network configuration parameter package and correspondences between the network configuration parameter package and an application scenario, a data uplink manner, and a geographic location.

With reference to the first aspect and the first possible implementation manner, in a second possible implementation manner, the selecting at least one target network configuration parameter package from network configuration parameter packages that are pre-saved by the portable router specifically includes: detecting whether a trigger signal exists, where the trigger signal is generated from a user operation and carries information about an application scenario selected by a user; and if it is detected that the trigger signal exists, selecting the target network configuration parameter package corresponding to the application scenario.

With reference to the first aspect and the first possible implementation manner, in a third possible implementation manner, the selecting at least one target network configuration parameter package from a configuration parameter that is pre-saved by the portable router specifically includes: detecting a data uplink manner of the uplink network port or a geographic location of the portable router; and selecting, according to the detected data uplink manner or geographic location, all corresponding target network configuration parameter packages.

With reference to the first aspect and the foregoing possible implementation manners, in a fourth possible implementation manner, the network configuration parameter package further includes at least one or more of Media Access Control MAC address binding information, bandwidth limitation information, and parental control information that are of the portable router.

To resolve the foregoing problem, according to a second aspect, the present invention provides a network parameter configuration apparatus for a portable router, including: a processing unit, configured to select at least one target network configuration parameter package from at least two network configuration parameter packages that are pre-saved by the portable router, where the network configuration parameter package includes at least a network connection parameter of the portable router; a configuration unit, connected to the processing unit and configured to set a network configuration parameter of the portable router according to the at least one target network configuration parameter package; and a network unit, connected to the configuration unit and configured to request to access an uplink network connected to an uplink network port of the portable router.

With reference to the second aspect, in a first possible implementation manner, the configuration unit is further configured to set the network configuration parameter of the portable router by using the network configuration parameter package; and the apparatus further includes a saving unit, connected to the configuration unit and the processing unit and configured to: detect whether the portable router is successfully connected to the uplink network, and if it is detected that the portable router is successfully connected to the uplink network, save the network configuration parameter package and correspondences between the network configuration parameter package and an application scenario and a data uplink manner.

With reference to the second aspect and the first possible implementation manner, in a second possible implementation manner, the processing unit is further configured to detect whether a trigger signal exists, where the trigger signal is generated from a user operation and carries information about an application scenario selected by a user; and if it is detected that the trigger signal exists, select the target network configuration parameter package corresponding to the application scenario.

With reference to the second aspect and the first possible implementation manner, in a third possible implementation manner, the processing unit is further configured to: detect a data uplink manner of the uplink network port or a geographic location of the portable router; and select, according to the detected data uplink manner or geographic location, all corresponding target network configuration parameter packages.

With reference to the second aspect and the foregoing possible implementation manners, in a fourth possible implementation manner, the network configuration parameter package further includes at least one or more of Media Access Control MAC address binding information, bandwidth limitation information, and parental control information that are of the portable router.

Beneficial Effects

A network configuration parameter of a portable router is set according to a network configuration parameter package that is saved, so that the portable router can request to access an uplink network connected to an uplink network port of the portable router. According to the network parameter configuration method and apparatus for a portable router of the present invention, when the portable router switches from one scenario to another, a configuration parameter of the portable router may be quickly restored to a configuration parameter that was pre-saved for the another application scenario, so that reconfiguration of the portable router is avoided and configuration efficiency is improved.

Exemplary embodiments are described in detail with reference to accompanying drawings to make other features and aspects of the present invention clearer.

BRIEF DESCRIPTION OF DRAWINGS

Accompanying drawings included in the specification and constructing a part of the specification jointly show the exemplary embodiments, characteristics and aspects of the present invention, and are intended to explain the principles of the present invention.

DESCRIPTION OF EMBODIMENTS

The following will describe various exemplary embodiments, features and aspects of the present invention in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The specific term "exemplary" herein means "used as an example, embodiment or illustrative". Any embodiment described as "exemplary" is not necessarily explained as being superior or better than other embodiments.

In addition, for better illustration of the present invention, various specific details are given in the following specific implementation manner. A person of ordinary skill in the art should understand that the present invention may be implemented without the specific details. In some other embodiments, methods, means, components, and circuits well known by a person skilled in the art are not described in detail, so that a main purpose of the present invention is highlighted.

Embodiment 1

Figure 1:
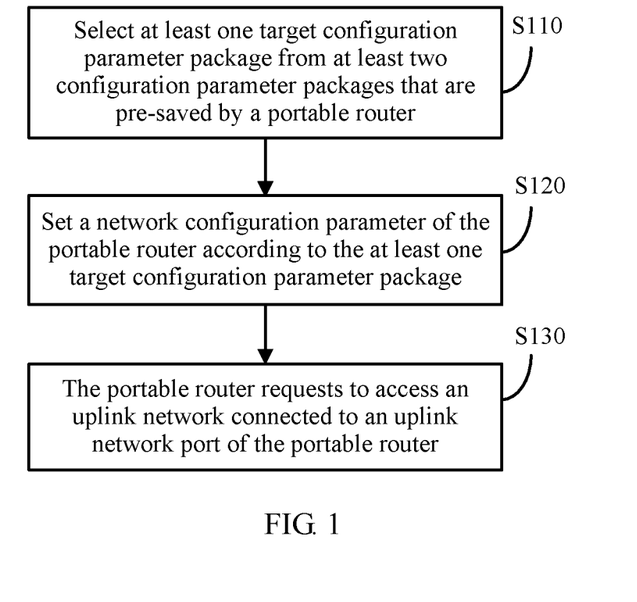
FIG. 1 is a flowchart of a network parameter configuration method for a portable router according to Embodiment 1 of the present invention.

FIG. 1 is a flowchart of a network parameter configuration method for a portable router according to Embodiment 1 of the present invention. As shown in FIG. 1, the network parameter configuration method for a portable router mainly includes the following steps:

Step S110. The portable router selects at least one target network configuration parameter package from at least two network configuration parameter packages that are pre-saved, where the network configuration parameter packages include at least a network connection parameter of the portable router.

Specifically, the portable router may pre-save multiple network configuration parameter packages. Each network configuration parameter package includes at least a network connection parameter of the portable router and carries information such as a corresponding application scenario, data uplink manner, and geographic location. The network connection parameter may include network connection parameter information required for successfully connecting the portable router to an uplink network, for example, information such as an Internet access account and a password that are allocated by the uplink network to the portable router. In addition to including the network connection parameter, the network configuration parameter package may further include some non-fundamental parameters. The uplink network includes various wired communications networks that are physically connected to the portable router by using a network cable. In addition, the portable router may further be connected to various wireless communications networks, for example, be connected to a 3rd-generation mobile communications (3G for short) network by using a subscriber identity module (SIM for short).

For example, the portable router may determine, according to a result of a user operation, an application scenario selected by the user, and select, from the network configuration parameter packages that are pre-saved, one network configuration parameter package corresponding to the application scenario as a target network configuration parameter package. The portable router may receive a result of an operation performed by the user on a corresponding virtual button or physical key on the portable router, or receive a result of an operation performed by the user on a software interface of a portable router management tool on a computer, so as to determine the application scenario selected by the user.

For another example, if the portable router detects that a network cable is inserted into the uplink network port or detects a geographic location in which the portable router is located, the portable router automatically selects, from the multiple network configuration parameter packages that are pre-saved, all network configuration parameter packages corresponding to the data uplink manner of the uplink network port as the target network configuration parameter package. A specific manner for detecting whether a network cable is inserted into the uplink network port may be determining whether a notification that the network cable is inserted into the uplink network port is received.

In a possible implementation manner, the network configuration parameter package may further include, but is not limited to, at least one or more of Media Access Control (MAC for short) address binding information, bandwidth limitation information, and parental control information that are of the portable router.

Specifically, the MAC address binding information may be used to specify a MAC address of a specific terminal device that is permitted to be connected in a current application scenario; the bandwidth limitation information may be used to specify a highest network bandwidth occupied by each terminal device that is permitted to be connected in the current application scenario; and the parental control information may be used to specify an Internet access time period, an Internet access duration, a network that is not permitted to be connected to, and the like, for each terminal device that is permitted to be connected in the current application scenario.

Step S120. The portable router sets a network configuration parameter of the portable router according to the at least one target network configuration parameter package.

Specifically, the portable router may set a configuration parameter of the portable router according to configuration information saved in the target network configuration parameter package, and make the configuration parameter effective. In addition, the portable router may be restarted after the configuration parameter of the portable router is set, so as to make the foregoing modified configuration parameter effective. The foregoing configuration parameter may be directly made effective without restarting the portable router. The portable router may receive a result of an operation performed by the user on a corresponding virtual button or physical key on the portable router, or receive a result of an operation performed by the user on a software interface of a portable router management tool on a computer, so as to configure the portable router.

It should be noted that the portable router may configure the portable router after a network cable is inserted into the uplink network port of the portable router, or may configure the portable router before a network cable is inserted into the uplink network port of the portable router. However, the portable router can request to access the uplink network connected to the uplink network port only after the network cable is inserted into the uplink network port of the portable router.

Step S130. The portable router requests to access an uplink network connected to an uplink network port of the portable router.

Specifically, if the portable router detects that a network cable is inserted into the uplink network port of the portable router, the portable router may request to access an uplink network corresponding to the uplink network port; and if the uplink network accepts an access request, the portable router may be successfully connected to the uplink network. A terminal device used by a user may be connected to the portable router by using a wireless local network (WLAN for short). For example, a terminal device (such as a mobile phone or a tablet computer) with a wireless fidelity network (WIFI for short) function may be connected to the portable router by using a WIFI network, so as to enable the terminal device to be connected to the uplink network by using the portable router.

In this way, in a case in which the portable router switches between multiple scenarios and needs to be reconfigured, when the portable router switches to a used application scenario, a network configuration parameter of the portable router may be quickly restored to a network configuration parameter that is saved, so that reconfiguration of the portable router when the portable router switches between multiple scenarios is avoided and configuration efficiency is improved.

Embodiment 2

Figure 2:
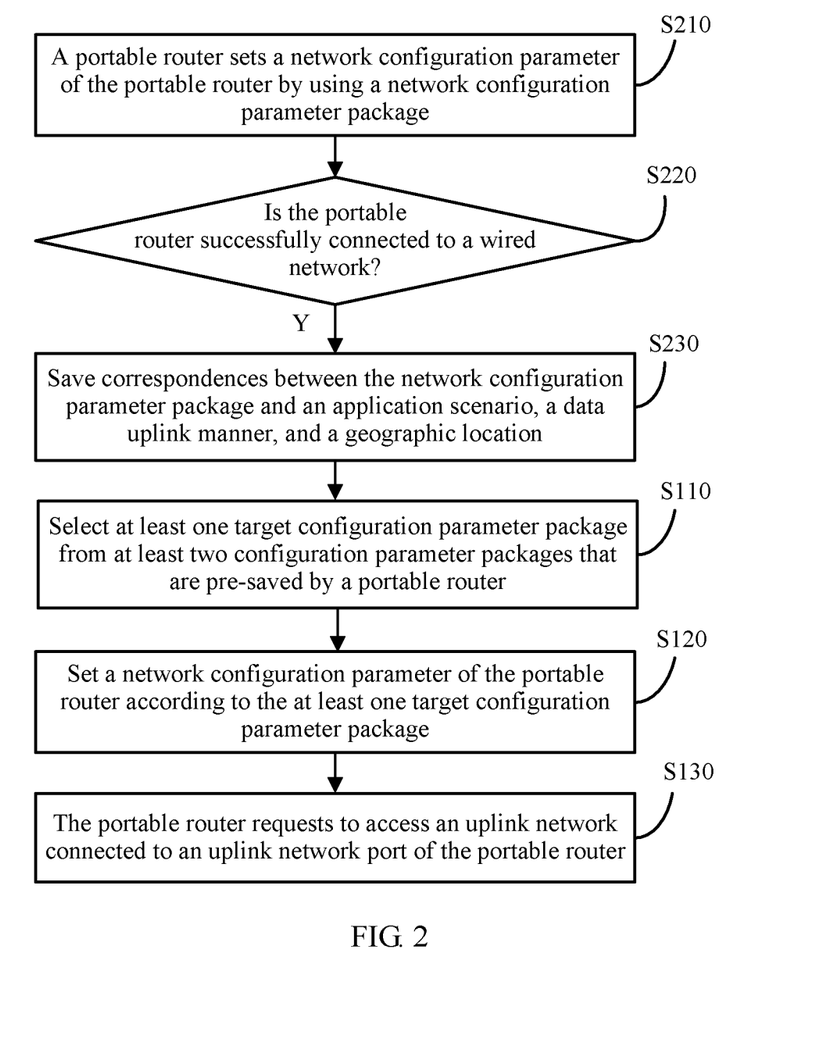
FIG. 2 is a flowchart of a network parameter configuration method for a portable router according to Embodiment 2 of the present invention.

FIG. 2 is a flowchart of a network parameter configuration method for a portable router according to Embodiment 2 of the present invention. Components in FIG. 2 and FIG. 1 that have a same reference numeral have a same function. For brevity, detailed descriptions of these components are omitted.

As shown in FIG. 2, the method shown in FIG. 2 mainly differs from the method shown in FIG. 1 in that: If a portable router can be successfully connected to an uplink network by using a network configuration parameter package, the network configuration parameter package and correspondences between the network configuration parameter package and an application scenario, a data uplink manner, and a geographic location are automatically saved.

Specifically, before step S110, the method may specifically include the following steps:

Step S210. A portable router sets a network configuration parameter of the portable router by using a network configuration parameter package.

Step S210. The portable router detects whether the portable router is successfully connected to an uplink network.

Step S220. If the portable router detects that the portable router is successfully connected to the uplink network, the portable router saves the network configuration parameter package and correspondences between the network configuration parameter package and an application scenario, a data uplink manner, and a geographic location.

TABLE 1

| Application scenario | Network configuration parameter package | Data transmission manner |
|---|---|---|
| Home | Network configuration parameter package 1 | PPPOE |
| Office | Network configuration parameter package 2 | DHCP |
| Hotel | Network configuration parameter package 3 | PPPOE |

Specifically, as shown in FIG. 2, in a specific application scenario and data uplink manner, if a network configuration parameter package is used to set the network configuration parameter of the portable router, and the portable router may be enabled to be successfully connected to a network, a saved network configuration parameter package is searched to detect whether a network configuration parameter package corresponding to a current application scenario exists. If the corresponding network configuration parameter package is not found, the portable router may save the network configuration parameter package, and save a current application scenario and a current data uplink manner and geographic location that are corresponding to the network configuration parameter package. The data uplink manner includes manners such as Point-to-Point Protocol over Ethernet (PPPOE for short), Dynamic Host Configuration Protocol (DHCP for short), or a static Internet Protocol (IP for short). The portable router receives a result of an operation performed by a user on a corresponding virtual button or physical key, or receives a result of an operation result performed by a user on a software interface of a portable router management tool on a computer, so as to save the network configuration parameter package. In addition, the portable router may further record a time at which the network configuration parameter package is saved.

As shown in Table 1, for one data uplink manner, the portable router may save multiple different network configuration parameter packages corresponding to different application scenarios. For example, for the manner of PPPOE, a "network configuration parameter package 1" and a "network configuration parameter package 3" may be saved, and corresponding application scenarios are a "home" and a "hotel", respectively.

For example, if the portable router is located in the "home" of the user, and the "network configuration parameter package 1" is used to successfully connect the portable router to the uplink network, after being successfully connected to the uplink network, the portable router may automatically prompt the user whether to save the network configuration parameter package. If the portable router receives an instruction for saving a network configuration parameter package that is selected by the user, the portable router saves the "network configuration parameter package 1", records the application scenario that is corresponding to the "network configuration parameter package 1" as "home" and the data uplink manner as "PPPOE", and records a geographic location corresponding to this application scenario, such as GPS location information. In addition, the portable router may further rename the "network configuration parameter package 1" as "home" according to an application scenario, so as to distinguish between network configuration parameter packages corresponding to different application scenarios.

For another example, if the portable router determines that a name of a current network configuration parameter package that is to be saved is the same as a name of a network configuration parameter package that is saved, the portable router prompts the user whether to replace the network configuration parameter package that is saved. If the portable router receives an instruction that the user chooses to replace the network configuration parameter package that is saved, the network configuration parameter package that is saved is replaced, which ensures that a saved network configuration parameter package is corresponding to a latest change of the application scenario.

After the network configuration parameter package is saved, the user may view all configuration entries of all network configuration parameter packages at any time, or view a configuration entry whose value is different from a factory value, and may further modify any one of the configuration entries of all the network configuration parameter packages at any time.

In this way, by recording all the network configuration parameter packages and application scenarios and data uplink manners that are corresponding to all the network configuration parameter packages, the portable router can quickly restore all configuration parameters that are pre-saved in this application scenario, so that the user does not need to manually perform repeated configuration, and usability for using the portable router is improved.

Embodiment 3

Figure 3:
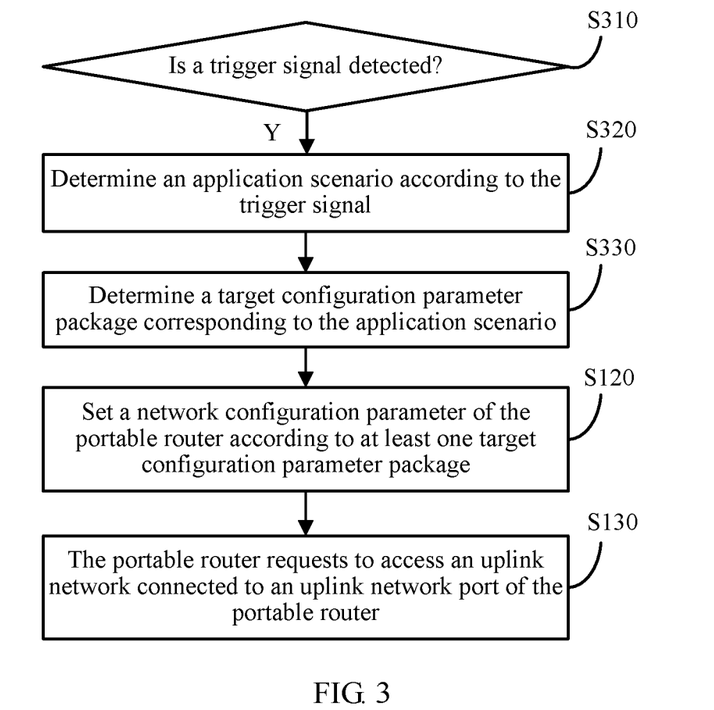
FIG. 3 is a flowchart of a network parameter configuration method for a portable router according to Embodiment 3 of the present invention.

FIG. 3 is a flowchart of a network parameter configuration method for a portable router according to Embodiment 3 of the present invention. Components in FIG. 3 and FIG. 1 to FIG. 2 that have a same reference numeral have a same function. For brevity, detailed descriptions of these components are omitted.

As shown in FIG. 3, the method shown in FIG. 3 mainly differs from the methods shown in FIG. 1 to FIG. 2 in that: a current application scenario and a target network configuration parameter package corresponding to a current application scenario are determined according to information about an application scenario selected by a user.

Specifically, step S110 may specifically include the following steps:

Step S310. A portable router detects whether a trigger signal exists, where the trigger signal is generated from a user operation and carries information about an application scenario selected by the user.

Step S320. If the portable router detects that the trigger signal exists, the portable router selects a target network configuration parameter package corresponding to the application scenario.

Specifically, if the portable router is located in an application scenario whose corresponding network configuration parameter package is pre-saved and requests to restore the network configuration parameter package corresponding to this application scenario, the portable router may receive the trigger signal generated from the user operation, where the trigger signal carries the information about the application scenario selected by the user. The portable router may use, according to the information about the application scenario carried by the trigger signal, the network configuration parameter package that is pre-saved and corresponding to the current application scenario as the target network configuration parameter package. The portable router may receive a result of an operation performed by the user on a corresponding virtual button or physical key, or receive a result of an operation performed by the user on a software interface of a portable router management tool on a computer, so as to generate the trigger signal.

For example, if the portable router receives a restoration request generated when the user operates the portable router, a list of all network configuration parameter packages that are pre-saved by the portable router, such as Table 1, is displayed on a display screen of the portable router or on a software interface of a portable router management tool on a computer. If the portable router receives a user operation in which the current application scenario selected by the user is a "home", the portable router may automatically restore, according to Table 1, a "network configuration parameter package 1" that is pre-saved and corresponding to the "home", where a corresponding data uplink manner is "PPPOE".

In this way, the portable router may select a corresponding target network configuration parameter package by using the current application scenario selected according to the user operation. When the user learns the current application scenario, the portable router can quickly restore the network configuration parameter package that is saved, so that a configuration operation of the user is simplified, and configuration efficiency is improved.

Embodiment 4

Figure 4:
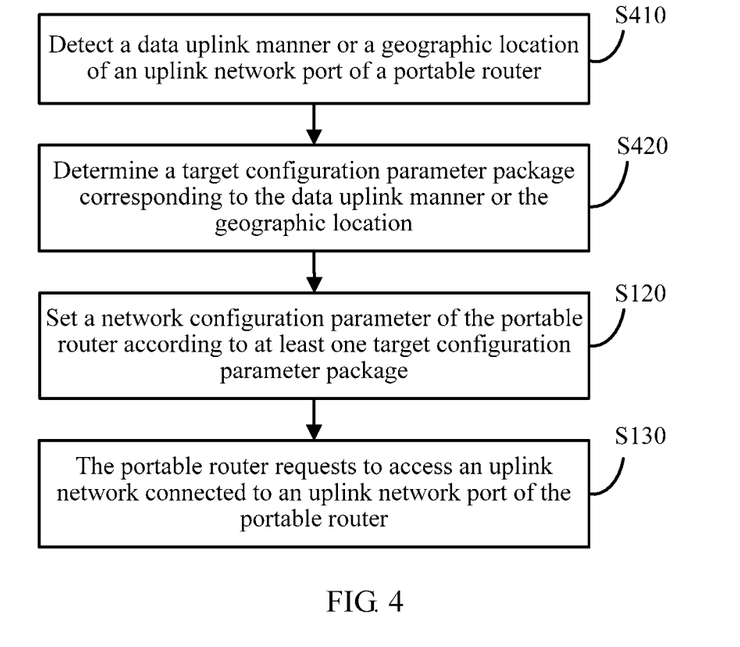
FIG. 4 is a flowchart of a network parameter configuration method for a portable router according to Embodiment 4 of the present invention.

FIG. 4 is a flowchart of a network parameter configuration method for a portable router according to Embodiment 4 of the present invention. Components in FIG. 4 and FIG. 1 to FIG. 3 that have a same reference numeral have a same function. For brevity, detailed descriptions of these components are omitted.

As shown in FIG. 4, the method shown in FIG. 4 mainly differs from the methods shown in FIG. 1 to FIG. 3 in that: a portable router determines, according to an automatically detected data uplink manner of a current uplink network, a current application scenario and a target network configuration parameter package corresponding to the current application scenario.

Specifically, step S110 may specifically include the following steps:

Step S410. A portable router detects a data uplink manner of an uplink network port or a geographic location in which the portable router is located.

Step S420. The portable router selects, according to a detected data uplink manner or geographic location, all corresponding target network configuration parameter packages.

Specifically, the portable router may automatically detect a data uplink manner or a geographic location of an uplink network connected to the uplink network port. According to a detection result, the portable router searches all network configuration parameter packages that are pre-saved, to detect whether an available network configuration parameter package that is corresponding to the current data uplink manner or the geographic location exists. The portable router detects all available network configuration parameter packages one by one and determines whether one of all the available network configuration parameter packages can enable the portable router to be successfully connected to the uplink network, or may first detect, according to a use record of each available network configuration parameter package that is saved, a network configuration parameter package that is most frequently used, and determine whether this network configuration parameter package can enable the portable router to be successfully connected to the uplink network. In this process, if any one of the network configuration parameter packages can enable the portable router to be successfully connected to the uplink network, the portable router uses this network configuration parameter package as the target network configuration parameter package. In addition, the portable router may preset, according to a requirement, whether all corresponding target network configuration parameter packages are selected preferentially according to the data uplink manner or preferentially according to the geographic location.

For example, if the portable router detects that an uplink network cable is inserted into the uplink network port, the portable router first detects that the uplink network connected to the uplink network port is an ADSL, where a data uplink manner of the uplink network port is a PPPOE manner. According to Table 1, the portable router determines, in all network configuration parameter packages that are pre-saved, that a "network configuration parameter package 1" and a "network configuration parameter package 3" are applicable to the PPPOE manner. Then, the portable router successively uses network connection parameters that are saved in the "network configuration parameter package 1" and network connection parameters that are saved in the "network configuration parameter package 3", such as an Internet access account and a password, so as to detect whether the network connection parameters can enable the portable router to be successfully connected to the uplink network. If the "network configuration parameter package 3" can enable the portable router to be successfully connected to a network of the network interface, the "network configuration parameter package 3" is used as the target network configuration parameter package.

For another example, if the portable router detects GPS location information of the portable router, the portable router accordingly determines that the geographic location in which the portable router is located is "home". According to Table 1, the portable router may search all network configuration parameter packages that are pre-saved, to detect whether a network configuration parameter package corresponding to the geographic location exists. As shown in Table 1, if the corresponding network configuration parameter package that is found is the "network configuration parameter package 1", the "network configuration parameter package 1" is used as the target network configuration parameter package.

In this way, the portable router determines, by automatically detecting a data uplink manner or a geographic location of a current network, the current application scenario and a target network configuration parameter package corresponding to the current application scenario, so that the portable router can automatically and quickly restore the pre-saved network configuration parameter package without a configuration operation of the user, thereby improving configuration efficiency.

Embodiment 5

Figure 5:
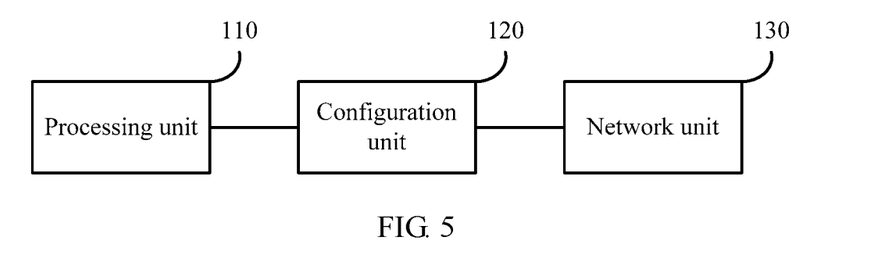
FIG. 5 is a block diagram of a parameter configuration apparatus for a portable router according to Embodiment 5 of the present invention.

FIG. 5 is a block diagram of a network parameter configuration apparatus for a portable router according to Embodiment 5 of the present invention.

As shown in FIG. 5, the apparatus mainly includes: a processing unit 110, a configuration unit 120, and a network unit 130. The processing unit 110 is configured to select at least one target network configuration parameter package from at least two network configuration parameter packages that are pre-saved by the portable router, where the network configuration parameter packages include at least a network connection parameter of the portable router. The configuration unit 120 is connected to the processing unit 110, and is configured to set a network configuration parameter of the portable router according to the at least one target network configuration parameter package. The network unit 130 is connected to the configuration unit 120, and is configured to request to access an uplink network connected to an uplink network port of the portable router.

In a possible implementation manner, the network configuration parameter package further includes at least one or more of Media Access Control MAC address binding information, bandwidth limitation information, and parental control information that are of the portable router.

For a specific mechanism used by the apparatus of this embodiment to implement parameter configuration of the portable router and a beneficial effect of the apparatus, reference may be made to FIG. 1 to FIG. 2 and descriptions related to FIG. 1 to FIG. 2.

Embodiment 6

Figure 6:
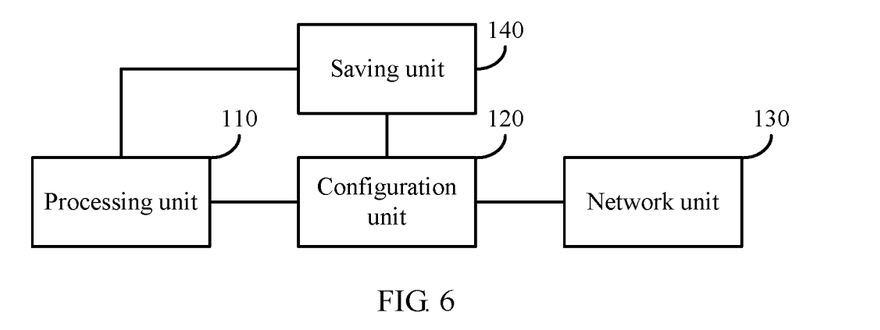
FIG. 6 is a block diagram of a parameter configuration apparatus for a portable router according to Embodiment 6 of the present invention.

FIG. 6 is a block diagram of a network parameter configuration apparatus for a portable router according to Embodiment 6 of the present invention. Components in FIG. 6 and FIG. 5 that have a same reference numeral have a same function. For brevity, detailed descriptions of these components are omitted.

As shown in FIG. 6, the apparatus shown in FIG. 6 mainly differs from the apparatus shown in FIG. 5 in that: a configuration unit 120 is further configured to set a network configuration parameter of a portable router by using a network configuration parameter package. The apparatus further includes a saving unit 140. The saving unit 140 is connected to the configuration unit 120 and the processing unit 110, and is configured to: detect whether the portable router is successfully connected to an uplink network; and if it is detected that the portable router is successfully connected to the uplink network, save the network configuration parameter package and correspondences between the network configuration parameter package and an application scenario, a data uplink manner, and a geographic location.

For a specific mechanism used by the apparatus of this embodiment to implement parameter configuration of the portable router and a beneficial effect of the apparatus, reference may be made to FIG. 1 to FIG. 2 and descriptions related to FIG. 1 to FIG. 2.

Embodiment 7

As shown in FIG. 5 to FIG. 6, the processing unit 110 is further configured to: detect whether a trigger signal exists, where the trigger signal is generated from a user operation and carries information about an application scenario selected by a user; and if it is detected that the trigger signal exists, select the target network configuration parameter package corresponding to the application scenario.

For a specific mechanism used by the apparatus of this embodiment to implement parameter configuration of the portable router and a beneficial effect of the apparatus, reference may be made to FIG. 3 and descriptions related to FIG. 3.

Embodiment 8

As shown in FIG. 5 to FIG. 6, the processing unit 110 is further configured to: detect a data uplink manner of the uplink network port or a geographic location of the portable router; and select, according to the detected data uplink manner or geographic location, all corresponding target network configuration parameter packages.

For a specific mechanism used by the apparatus of this embodiment to implement parameter configuration of the portable router and a beneficial effect of the apparatus, reference may be made to FIG. 4 and descriptions related to FIG. 4.

Embodiment 9

Figure 7:
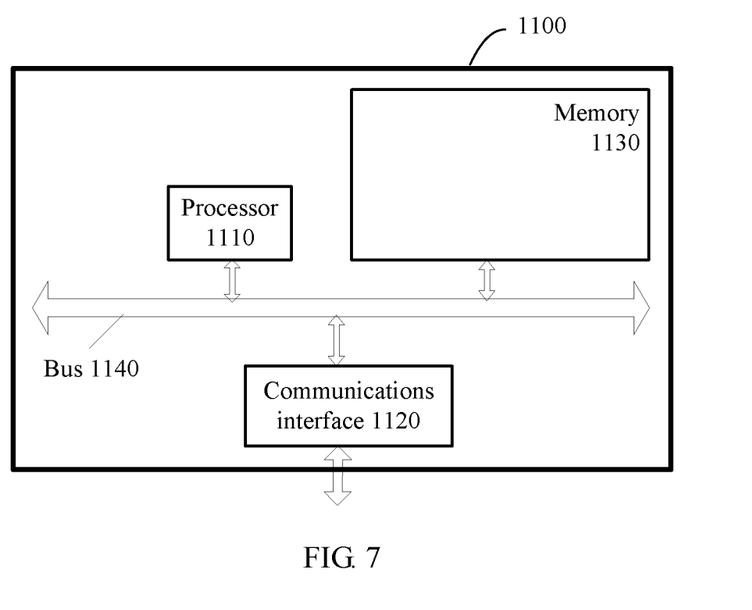
FIG. 7 is a block diagram of a parameter configuration apparatus for a portable router according to Embodiment 9 of the present invention.

FIG. 7 is a block diagram of a network parameter configuration apparatus for a portable router according to Embodiment 9 of the present invention. A network parameter configuration apparatus 1100 of the portable router may be a host server that has a computing capability, a personal computer PC, a portable computer or terminal, or the like. A specific embodiment of the present invention imposes no limitation on a specific implementation of the computing node.

The network parameter configuration apparatus 1100 of the portable router includes a processor (processor) 1110, a communications interface (Communications Interface) 1120, a memory (memory) 1130, and a bus 1140. The processor 1110, the communications interface 1120, and the memory 1130 implement mutual communication by using the bus 1140.

The communications interface 1120 is configured to communicate with a network device, where the network device includes, for example, a virtual machine management center and a shared memory.

The processor 1110 is configured to execute a program. The processor 1110 may be a central processing unit CPU, or an application specific integrated circuit ASIC (Application Specific Integrated Circuit), or one or more integrated circuits configured to implement this embodiment of the present invention.

The memory 1130 is configured to store a file. The memory 1130 may include a high-speed RAM memory, and may further include a non-volatile memory (non-volatile memory), for example, at least one disk memory. The memory 1130 may be a memory array. The memory 1130 may be segmented, and the segments may form a virtual volume according to a specific rule.

In a possible implementation manner, the foregoing program may be a program code that includes a computer operation instruction. The program may be specifically configured to: select at least one target network configuration parameter package from at least two network configuration parameter packages that are pre-saved by the portable router, where the network configuration parameter packages include at least a network connection parameter of the portable router; set a network configuration parameter of the portable router according to the at least one target network configuration parameter package; and request, by the portable router, to access an uplink network connected to an uplink network port of the portable router.

In a possible implementation manner, the foregoing program may further be configured to: set, by the portable router by using the network configuration parameter package, the network configuration parameter of the portable router; detect whether the portable router is successfully connected to the uplink network; and if it is detected that the portable router is successfully connected to the uplink network, save the network configuration parameter package and correspondences between the network configuration parameter package and an application scenario and a data uplink manner.

In a possible implementation manner, the foregoing program may further be configured to: detect whether a trigger signal exists, where the trigger signal is generated from a user operation and carries information about an application scenario selected by a user; and if it is detected that the trigger signal exists, select the target network configuration parameter package corresponding to the application scenario.

In a possible implementation manner, the foregoing program may further be configured to: detect a data uplink manner of the uplink network port or a geographic location of the portable router; and select, according to the detected data uplink manner or geographic location, all corresponding target network configuration parameter packages.

In a possible implementation manner, the foregoing program may further be configured to: the network configuration parameter package further includes at least one or more of Media Access Control MAC address binding information, bandwidth limitation information, and parental control information that are of the portable router.

A person of ordinary skill in the art may be aware that exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented by computer software and are sold or used as independent products, it may be deemed, to some extent, that all or part (such as the part that contributes to the prior art) of the technical solutions of the present invention is embodied by a computer software product. The computer software product is generally stored in a computer readable non-volatile storage medium and includes several instructions for instructing a computer device (which may be a personal computer, a server, or a network device, and the like) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network parameter configuration method for a portable router, comprising:
setting, by the portable router by using a network configuration parameter package, a network configuration parameter of the portable router;
detecting whether the portable router is successfully connected to an uplink network;
if it is detected that the portable router is successfully connected to the uplink network, saving: (1) the network configuration parameter package and correspondences between the network configuration parameter package and an application scenario, (2) a data uplink manner, and (3) a geographic location;
selecting, by the portable router, at least one target network configuration parameter package from at least two network configuration parameter packages that are pre-saved by the portable router, wherein the network configuration parameter package comprises at least a network connection parameter of the portable router;
setting, by the portable router according to the at least one target network configuration parameter package, a network configuration parameter of the portable router; and
requesting, by the portable router, to access the uplink network connected to an uplink network port of the portable router,
wherein the selecting at least one target network configuration parameter package from at least two network configuration parameter packages that are pre-saved by the portable router comprises:
detecting whether a trigger signal exists, wherein the trigger signal is generated from a user operation and carries information about the application scenario, wherein the application scenario is selected by a user; and
selecting the target network configuration parameter package corresponding to the application scenario when it is detected that the trigger signal exists, and
wherein the selecting at least one target network configuration parameter package from at least two configuration parameters that are pre-saved by the portable router comprises:
detecting the geographic location of the portable router; and
selecting, according to the geographic location, all corresponding target network configuration parameter packages.

2. The method according to claim 1 wherein the network configuration parameter package further comprises at least one or more of Media Access Control (MAC) address binding information, bandwidth limitation information, and parental control information that are of the portable router.

3. A parameter configuration apparatus for a portable router, comprising:
a processing unit, configured to select at least one target network configuration parameter package from at least two network configuration parameter packages that are pre-saved by the portable router, wherein the network configuration parameter package comprises at least a network connection parameter of the portable router;
a configuration unit, connected to the processing unit and configured to set a network configuration parameter of the portable router according to the at least one target network configuration parameter package; and
a network unit, connected to the configuration unit and configured to request to access an uplink network connected to an uplink network port of the portable router;
wherein the configuration unit is further configured to:
set the network configuration parameter of the portable router by using the network configuration parameter package; and the apparatus further comprises a saving unit, connected to the configuration unit and the processing unit and configured to: detect whether the portable router is successfully connected to the uplink network, and if it is detected that the portable router is successfully connected to the uplink network, save: (1) the network configuration parameter package and correspondences between the network configuration parameter package and an application scenario and (2) a data uplink manner, wherein the processing unit is further configured to:

detect a geographic location of the portable router; and select, according to the geographic location, all corresponding target network configuration parameter packages.

4. The apparatus according to claim 3, wherein the processing unit is further configured to:

detect whether a trigger signal exists, wherein the trigger signal is generated from a user operation and carries information about an application scenario selected by a user; and if it is detected that the trigger signal exists, select the target network configuration parameter package corresponding to the application scenario.

5. The apparatus according to claim 3, wherein the network configuration parameter package further comprises at least one or more of Media Access Control (MAC) address binding information, bandwidth limitation information, and parental control information that are of the portable router.

* * * * *